United States Patent [19]

Sullivan et al.

[11] Patent Number: 5,754,624
[45] Date of Patent: May 19, 1998

[54] TELEPHONE LINE TEST KIT

[75] Inventors: Robert W. Sullivan, Simi Valley; Lee A. Watkins, Thousand Oaks, both of Calif.

[73] Assignee: Test-um, Inc., Camarillo, Calif.

[21] Appl. No.: 708,368

[22] Filed: Sep. 4, 1996

[51] Int. Cl.[6] .......................... H04M 1/24; H04M 3/08; H04M 3/22
[52] U.S. Cl. ..................... 379/27; 379/21; 379/26; 379/30
[58] Field of Search ......................... 379/1, 2, 9, 10, 379/12, 15, 19, 21, 22, 24, 26, 27, 30, 32, 34

[56] References Cited

U.S. PATENT DOCUMENTS

| | | | |
|---|---|---|---|
| 4,564,728 | 1/1986 | Romano | 379/27 |
| 4,581,494 | 4/1986 | Pickens | 379/27 |
| 4,852,145 | 7/1989 | Bevers et al. | 379/29 |
| 4,991,196 | 2/1991 | Krebs | 379/21 |

*Primary Examiner*—Curtis Kuntz
*Assistant Examiner*—Binh K. Tieu
*Attorney, Agent, or Firm*—Gene W. Arant

[57] ABSTRACT

An electrical test kit for testing a telephone line from the terminals at the customer's end of the line includes a circuit for testing line continuity without falsely indicating to the voltage source that a telephone call has been answered, a push-button selection switch and a parallel pair of light-emitting diodes connected in reverse polarity relative to each other for determining polarity of the telephone line, and test pads in parallel with the continuity test circuit for permitting the attachment of a voltmeter so as to determine the magnitude of the internal resistance of the telephone line.

4 Claims, 2 Drawing Sheets

5,754,624

1

TELEPHONE LINE TEST KIT

FIELD OF THE INVENTION

This invention relates to test devices for electrical circuits, and particularly for use with telephone or other voice communication circuits.

BACKGROUND OF THE INVENTION

There is a great deal of need for convenient test devices to test telephone circuits or other voice communication circuits. Such devices typically will measure circuit continuity, proper polarity, and other factors pertinent to the proper operation of the circuitry. Typically the device is in the form of an elongated connector that may have both of its ends temporarily connected to a circuit to be tested. Typically, such a device may be interposed in series in the circuit for in-line testing, by connecting it between the wall jack and a telephone.

For data circuits a "straight-through connection" may be used for the conductors inside the connector, and pin 1 of the jack at one end is then electrically connected to pin 1 of the jack at the other end. Voice circuit testing, however, is best accomplished with a connector that is "reverse-wired", meaning that pin 1 of the jack at one end is connected to the highest numbered pin of the jack at the other end, which is typically pin 6.

Alternatively, as is also well known, such a device may be used by connecting only one of its ends to a circuit to be tested. For example, it is connected to a telephone jack to test an incoming telephone line. One parameter of great interest is the "tone" that exists when the normal direct current driven by a 24 volt source is flowing through the telephone line. Another parameter of interest is the signal loss that occurs as a result of the electrical resistance in the customer's line extending from the central office.

Since many different parameters and conditions may be tested, there is always a need for test devices that are versatile in their capabilities but are at the same time easy to use, inexpensive, and reliable.

SUMMARY OF THE PRESENT INVENTION

The present invention provides an electrical test kit for testing a telephone line from the terminals at the customer's end of the line to simultaneously test continuity, polarity, tone or line voltage received from the telephone central office or other voltage source, and line resistance. Alternatively, the test kit may be used for in-line testing while the circuit remains in operation.

One component of our novel test kit is a circuit box that contains contacts connectable to a telephone jack; and a series loop circuit, controlled by a push-button switch, that contains light emitting diodes for indicating circuit continuity, line voltage, and polarity of terminals. This circuit box is also provided with breakout test pads that allow access to the circuit being tested without disrupting service.

A second component of our novel test kit is a standard voltmeter, used in conjunction with the push-button circuit and the breakout pads to determine whether the resistance in the telephone line leading to the customer's premises is within allowable limits.

DRAWING SUMMARY

FIG. 1 is a schematic drawing illustrating the operation of our new test kit;

2

FIG. 3 is a schematic drawing of the preferred arrangement of the push-button switches.

DETAILED DESCRIPTION OF PREFERRED EMBODIMENT

Figure 1:
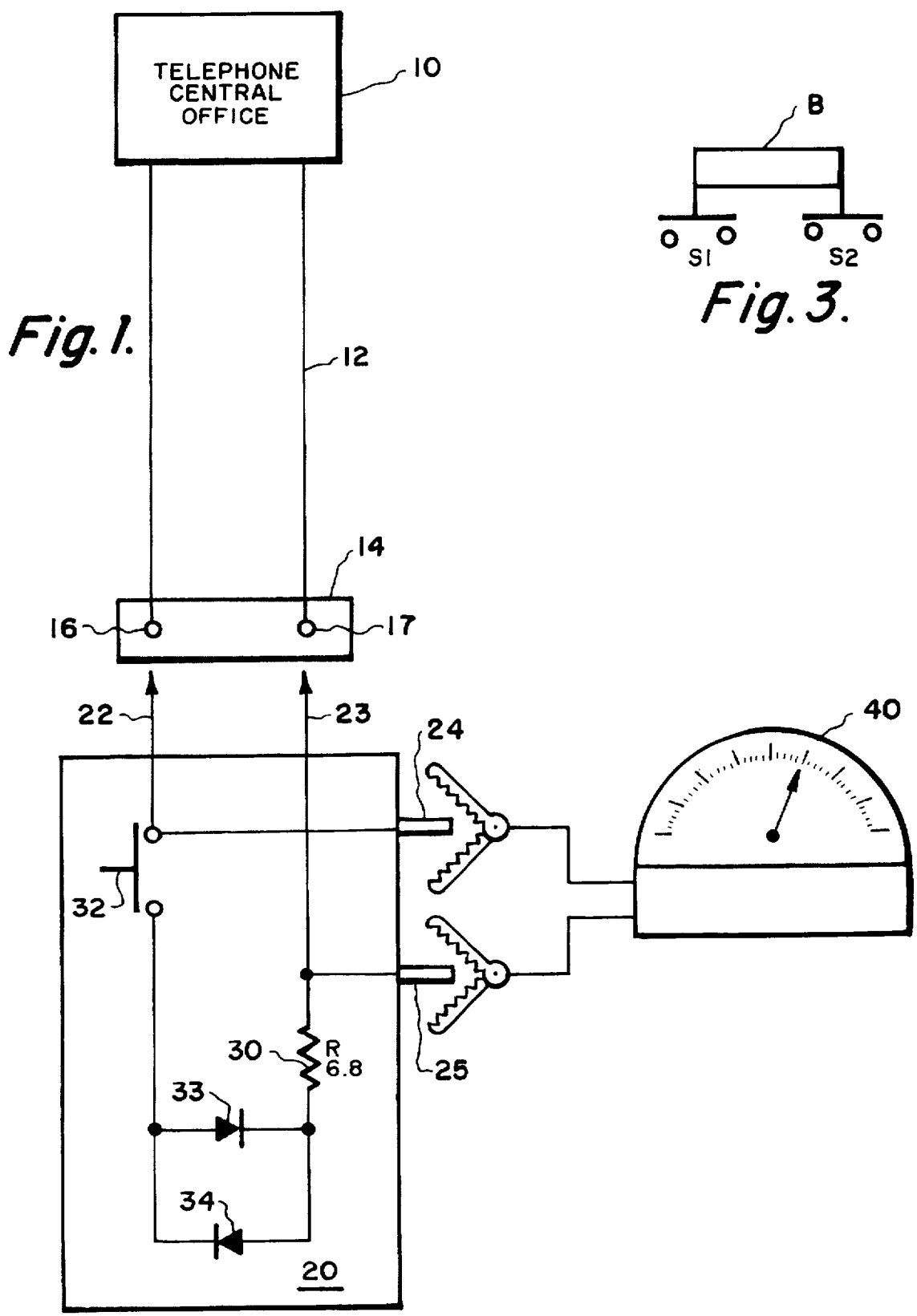

Referring now to FIG. 1, an electrical test kit for testing a telephone line from the terminals at the customer's end of the line includes a circuit box 20 and a standard D. C. voltmeter 40. The telephone company central office is indicated at 10, and the line to the customer's premises at 12. A wall jack in the customer's premises is designated as 14, having terminals 16, 17.

Circuit box 20 includes a pair of contacts 22, 23 adapted to be temporarily connected to the corresponding terminals 16, 17 of the wall jack. A test circuit connected in a series loop between the contacts 22, 23 includes a push-button switch 32, a resistor 30, and a parallel pair of light-emitting diodes 33, 34. The diodes are connected in reverse polarity relative to each other, so that when the push-button switch is closed the lighting of either of the LEDs will indicate both the presence of line voltage and circuit continuity. Furthermore, the particular LED that is lighted will indicate the polarity of the terminals 16, 17.

The purpose of our test kit is to simultaneously test continuity, polarity, line voltage received from the telephone company office or other voltage source, and line resistance of the line leading to the customer's premises.

The resistance value of the resistor 30 is chosen in the range of about three to ten thousand ohms so that the temporary connection of the test circuit to the telephone terminals will not falsely indicate to the switchboard at the telephone company office that a telephone call has been answered by taking a telephone off hook. Preferably the value of resistor 30 is 6.8k ohms.

The circuit box 20 also a pair of metal breakout test pads 24, 25 which are connected to respective ones of the contacts 22, 23. The voltmeter 40 may be connected by means of standard alligator clips to the test pads 24, 25 for providing a voltage reading that indicates the magnitude of the line resistance from the source to the terminals of the telephone jack. For example, if the voltmeter indicates 24 volts, the line resistance is negligible and very acceptable. On the other hand, if the voltmeter indicates only 12 volts or less, the line resistance is considered excessive, and the customer is not being adequately served because too much signal will be lost in transmitting messages to his telephone instrument.

Figure 2:
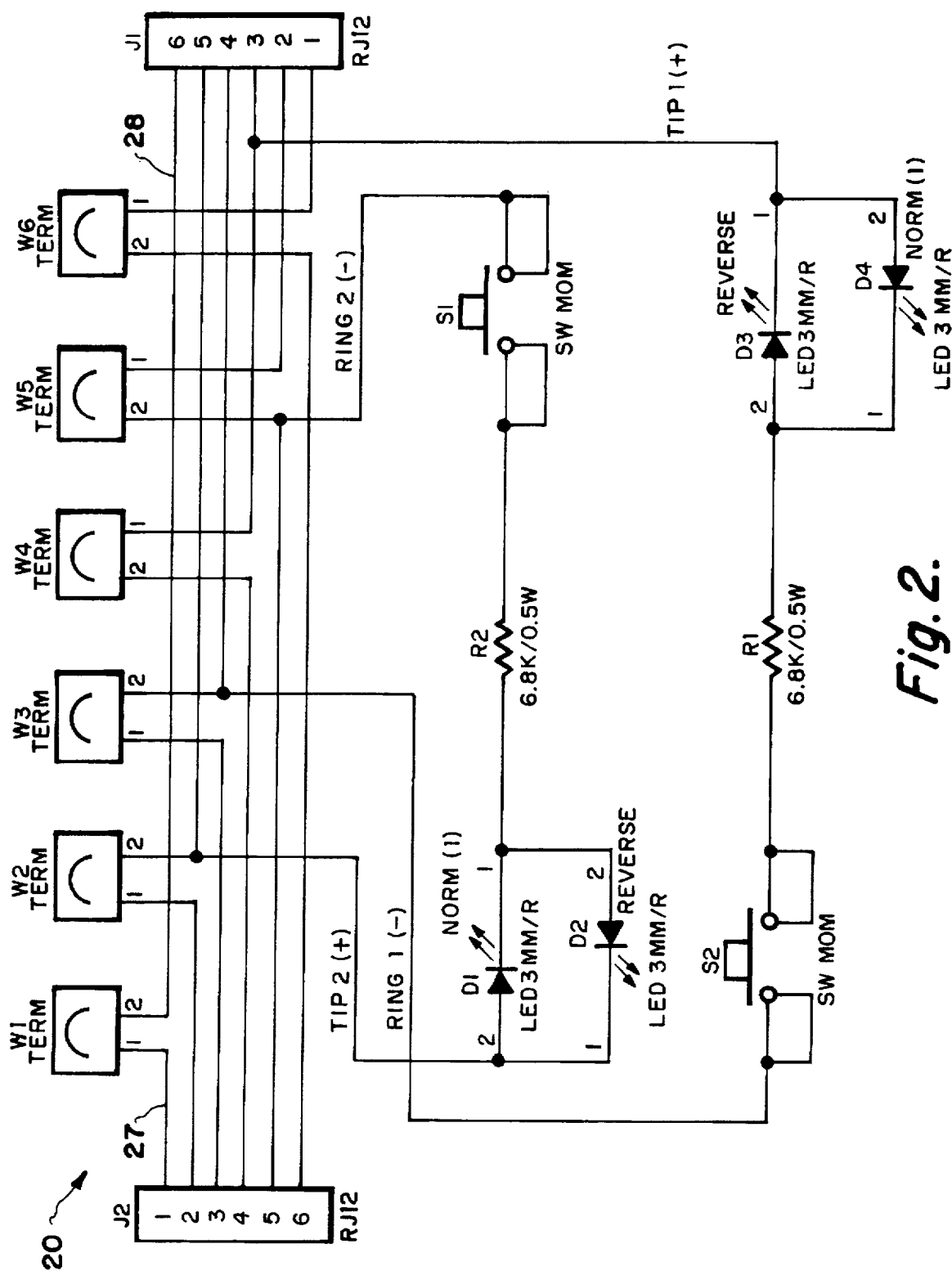
FIG. 2 is a detailed schematic diagram of the circuit in the circuit box.

FIG. 2 shows schematically the full circuit inside the circuit box 20. As shown in FIG. 2 the circuit box 20 has jacks J1 and J2 at its respective ends, which are of the RJ12 type. Each has six pins numbered 1 through 6, inclusive. Internal wiring of the circuit box is such as to connect pin 1 of one jack with pin 6 of the other, and so on.

Also included in circuit box 20 are metal test pads W1 . . . W6, inclusive. Each is connected in series with a respective conductor inside the box. For example, test pad W1 is connected in series with two separate parts 27, 28 of a conductor that connects pin 1 of jack J2 with pin 6 of jack J1.

In a six-wire telephone cable, a common practice is to arrange wires 2 and 5 as a pair, and 3 and 4 as another pair. Wires 3 and 4 correspond to the example of FIG. 1. That is, wire 3 of jack J2 and wire 4 of jack J1 connected to test pad W3 are also connected through a Ring Line 1 to a push-button switch S 2, and to a resistor R1 that has a resistance value of 6.8 kilohms and is rated at 0.5 watt power dissipation. A pair of light-emitting diodes D3 and D4 connected in parallel but in reverse polarity to each other are then connected between the other end of resistor R1 and test pad W4, which is connected to wire 3 of jack J1 and wire 4 of jack J2. This is the same circuit as described in conjunction with FIG. 1.

The circuit box 20 includes another identical circuit, in which switch S1, resistor R2, diode pair D1/D2, and Ring Line 2, are connected in a series loop to wires 2 and 5 of the cable.

FIG. 3 shows the preferred manner of mechanizing the push buttons. As schematically shown there, a single push bar B is attached to both of the push buttons for actuating both of them simultaneously. This makes it possible to test two circuits at the very same time.

The important advantage of our invention is its extreme versatility—that is, the circuit box may be used alone or in conjunction with the test pads and voltmeter for in-line testing.

It may also be used either alone or in conjunction with the test pads and voltmeter for testing simply from the end of the customer's phone line. The operator may depress one or both pushbuttons at the same time that the voltmeter reading is being observed.

The presently preferred form of the invention has been disclosed in detail in order to comply with the patent laws. However, the scope of the invention is to be judged only in accordance with the appended claims.

What we claim is:

1. An electrical test device for a telephone circuit for simultaneously testing continuity, polarity, line voltage received from a voltage source, and line resistance from the source, said test device comprising, in combination:
   means providing a pair of contacts adapted to be temporarily connected to corresponding terminals of a telephone jack;
   a test circuit connected in a series loop between said contacts including a push-button switch, a resistor, and a parallel pair of light-emitting diodes connected in reverse polarity relative to each other, whereby when said push-button switch is closed the lighting of either of said LEDs will indicate both the presence of line voltage and circuit continuity, and which particular LED is lighted will indicate polarity of the telephone jack terminals;
   the resistance value of said resistor being chosen in the range of about three to ten thousand ohms so that the temporary connection of said device to the terminals of the telephone jack will not falsely indicate to the voltage source that a telephone call has been answered by taking a telephone off hook; and
   a pair of breakout test pads connected to respective ones of said contacts so that a voltmeter may be connected to said test pads for providing a voltage reading that will then indicate the magnitude of the line resistance from the source to the jack.

2. An electrical test kit for testing a telephone line from the terminals at the customer's end of the line to simultaneously test continuity, polarity, line voltage received from a voltage source, and line resistance, said test kit comprising:
   means providing a pair of contacts adapted to be temporarily connected to the corresponding terminals;
   a test circuit connected in a series loop between said contacts, including a push-button switch, a resistor, and a parallel pair of light-emitting diodes connected in reverse polarity relative to each other, whereby when said push-button switch is closed the lighting of either of said LEDs will indicate both the presence of line voltage and circuit continuity, and the particular LED that is lighted will indicate the polarity of the telephone terminals;
   the resistance value of said resistor being chosen in the range of about three to ten thousand ohms so that the temporary connection of said test circuit to the telephone terminals will not falsely indicate to the voltage source that a telephone call has been answered by taking a telephone off hook;
   a pair of breakout test pads connected to respective ones of said contacts; and
   a voltmeter connected to said test pads for providing a voltage reading that indicates the magnitude of the line resistance from the source to the terminals.

3. An electrical test box having six-pin jacks at its respective ends, of the RJ12 type;
   six metal test pads, each connected in series with two separate parts of a conductor that connects a pin 1 of one jack with a pin of the other jack;
   two test circuits, each being connected in a series loop between two pins of each of said jacks, each of said test circuits including a push-button switch, a resistor, and a parallel pair of light-emitting diodes connected in reverse polarity relative to each other, whereby when said push-button switch is closed the lighting of either of said LEDs will indicate both the presence of line voltage and circuit continuity, and which particular LED is lighted will indicate polarity of the telephone jack terminals;
   the resistance value of each of said resistors being chosen in the range of about three to ten thousand ohms so that the temporary connection of said device to the terminals of the telephone jack will not falsely indicate to the voltage source that a telephone call has been answered by taking a telephone off hook; and
   a separate pair of breakout test pads connected to the two pins associated with each of said test circuits.

4. An electrical test box as in claim 3 which further includes a push bar for actuating said two push buttons at the same time.

* * * * *